April 25, 1944.    H. C. HARBERS    2,347,409
SIX WHEEL MOTOR VEHICLE
Filed Feb. 7, 1942    3 Sheets-Sheet 1

HENRY C. HARBERS,
INVENTOR

BY Edwin D. Jones
ATTORNEY.

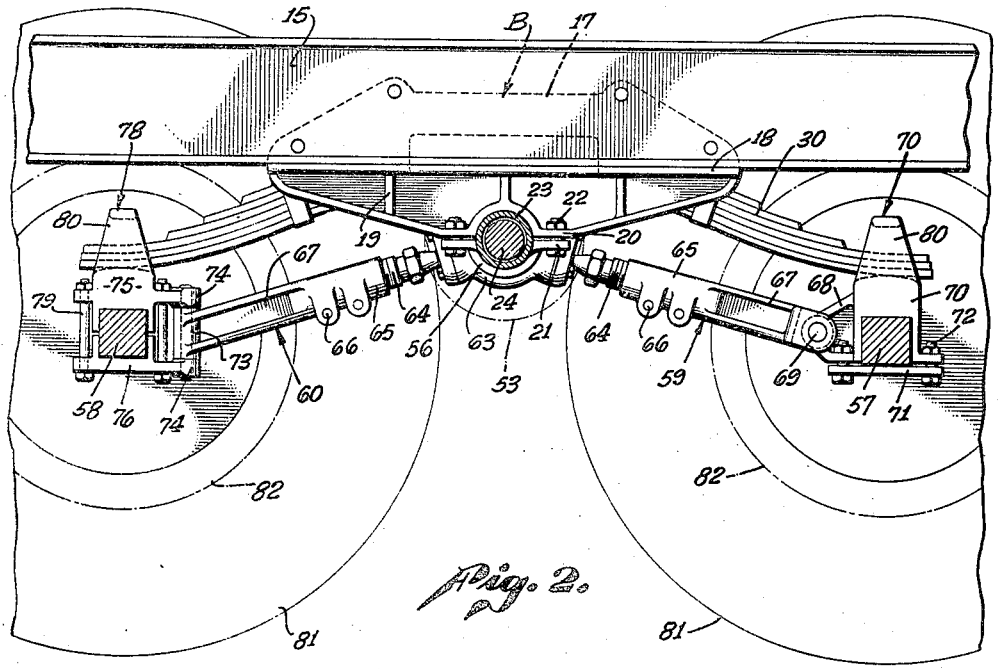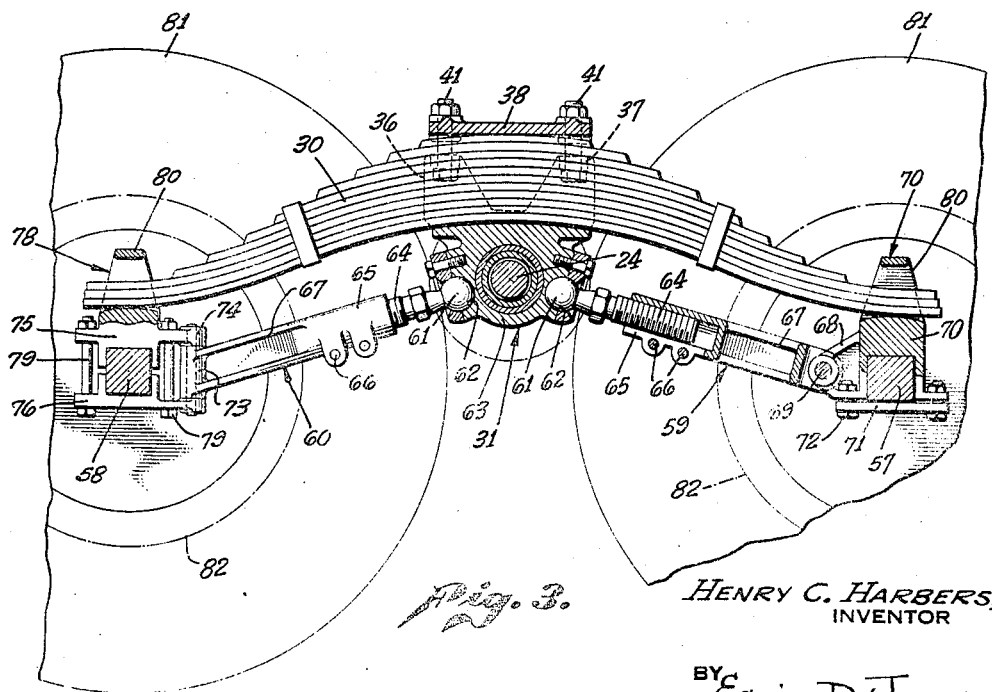

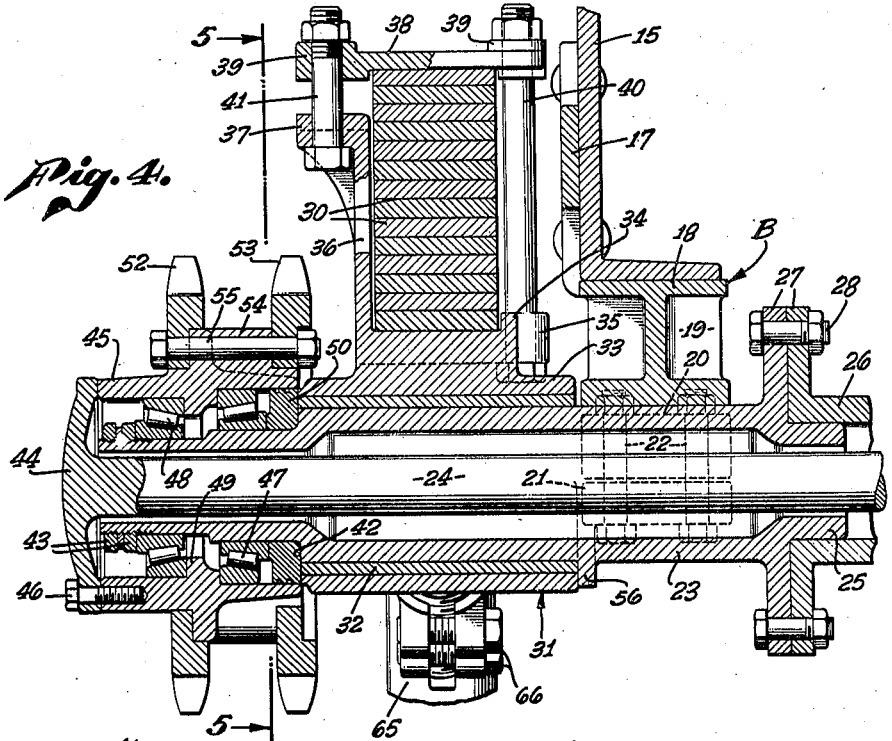
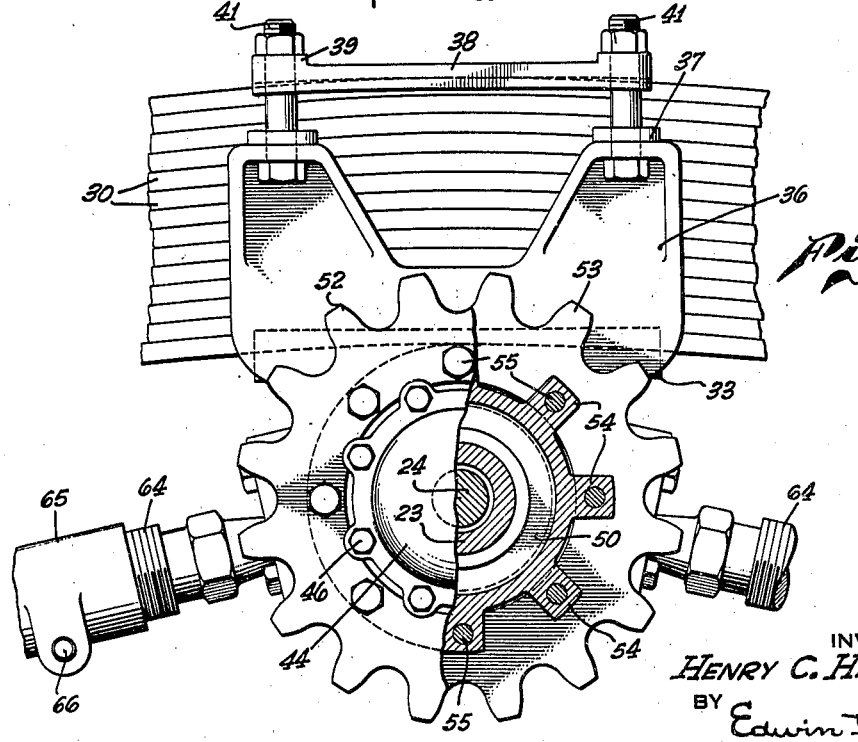

Patented Apr. 25, 1944

2,347,409

UNITED STATES PATENT OFFICE 2,347,409

SIX WHEEL MOTOR VEHICLE

Henry C. Harbers, San Gabriel, Calif., assignor to C. B. Equipment Co., Los Angeles, Calif., a co-partnership Application February 7, 1942, Serial No. 429,889

3 Claims. (Cl. 180—22)

My invention relates to six wheel motor vehicles of that character having a four wheel driving unit, with suspension springs pivotally mounted for oscillation and supporting a pair of axles on which the wheels are mounted in pairs at opposite sides of the vehicle frame, and in conjunction with a chain and sprocket mechanism for driving each of the wheels. This structural organization provides a support for the driving wheels by which free and independent actions of the wheels is permitted to compensate for road irregularities.

Where the four wheels of such a truck are driven by a chain and sprocket mechanism, provision must be made for preventing both longitudinal and transverse shifting of the axles in relation to the frame, in order that the wheels be held in proper alinement with each other and with the driving mechanism. Various means, such as tie rods, have been provided heretofore, for holding the axles against shifting transversely of the vehicle frame but such means are structurally complex, and thus add materially to the cost of manufacture, as well as maintaining their upkeep.

It is a purpose of my invention to provide, in a six wheel motor vehicle of the above described character, means by which the suspension springs are utilized to maintain the axles against shifting transversely of the vehicle frame, by so mounting the springs that they cannot shift laterally in either direction, and being connected to the axles, the latter are held by the springs in fixed positions transversely of the vehicle frame.

It is also a purpose of my invention to provide a four wheel driving unit for trucks of the above described character, wherein radius rods are employed to hold the axles against shifting longitudinally of the vehicle frame, and in conjunction with the mountings for the suspension springs whereby the axles are held against shifting transversely of the vehicle frame.

Another purpose of my invention is a provision in a four wheel drive unit having a chain and sprocket driving mechanism of a structure which affords an extremely close arrangement of drive sprockets and suspension springs, thereby permitting the use of larger tires for vehicles of a given width and yet preserving the maximum tread of the vehicle prescribed by law.

A still further purpose of my invention is the provision in a four wheel drive unit, of an arrangement of radius rods and torque rods, whereby twisting of the vehicle frame resultant of a brake application, is made negligible, and thus the possibility is reduced to a minimum of the vehicle frame being broken, as well as any detrimental shifting of the load carried by the vehicle.

I will describe only one form of six wheel motor vehicle embodying my invention, and will then point out the novel features thereof in claims.

In the accompanying drawings:

Fig. 2 is a vertical longitudinal sectional view, enlarged and taken on the line 2—2 of Fig. 1.

Fig. 3 is a view similar to Fig. 2, taken on the line 3—3 of Fig. 1.

Fig. 4 is an enlarged vertical sectional view taken on the line 4—4 of Fig. 1.

Fig. 5 is a vertical sectional view taken on the line 5—5 of Fig. 4.

Similar reference characters refer to similar parts in each of the several views.

Figure 1:
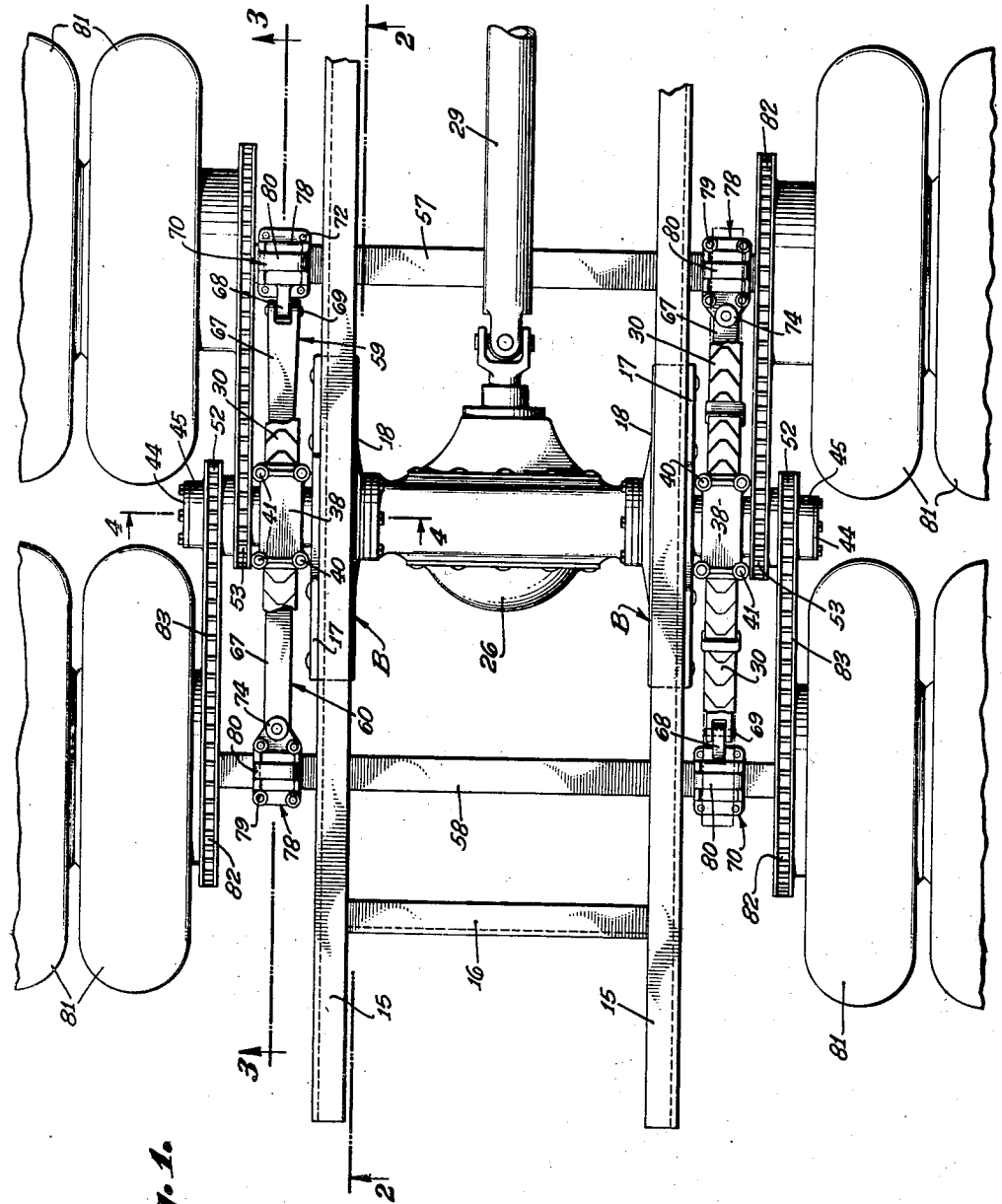
Fig. 1 is a fragmentary plan view of the motor vehicle embodying my invention, parts being broken away to reveal elements not otherwise disclosed.

Referring specifically to the drawings, in Fig. 1 the frame of the vehicle at its rear end is shown as comprising two side members 15 in the form of channel beams, connected by a cross member 16. Secured, at opposite points, to the side members 15 are a pair of identical brackets B, each shown in Figs. 1 and 4 as comprising a vertical portion 17 riveted to the outer side of the respective side member 15, and a horizontal portion 18 from which depends a vertical web 19. At its center the web 19 is constructed to form a semi-circular seat 20, and wings 21, 21 coact with the seat and with bolts 22 to form a clamp for securing to the bracket a tubular housing for a jack shaft 24 (Fig. 2).

As shown in Fig. 4, the inner end of each housing 23 is formed with a reduced extension 25 which projects into the confronting end of a differential housing 26. The two housings are secured one to the other, by flanges 27 formed on the confronting ends of the housings, through which bolts 28 extend for securing the flanges to each other.

The housing 26 extends transversely of the vehicle frame, as shown in Fig. 1, and may contain any conventional form of differential mechanism by which the two jack shafts 24 may be driven from a drive shaft 29.

Two suspension springs 30 are pivotally mounted to oscillate on the two jack shaft housings 23. The mounting for each spring, comprising a trunnion hub 31, receiving the respective housing 23, with a suitable bushing 32 interposed between the two. Formed integral with the hub 31 at the upper side thereof is a saddle 33 for the respective spring 30. The inner side edge of this saddle is formed with an upstanding lip 34, and at the ends of the lip are a pair of ears 35. The saddle, at the opposite or outer side, is formed with an upstanding flange 36 which may have the bifurcated form shown in Fig. 5, to provide spaced members, the upper ends of which are formed with ears 37.

As shown in Fig. 4 the leaves of the spring 30 are stacked upon the saddle 33, between the lip 34 and the flange 36, with a pressure plate 38 on the uppermost leaf and provided with ears 39 at the four corners thereof. At the inner side of the spring, relatively long bolts 40 extend through the ears 35 and the ears 39 directly thereabove on the plate 38. On the outer side of the spring, relatively short bolts 41 extend through the ears 37 and through the corresponding ears of the plate 38. Thus, through the medium of the bolts 40 and 41, and the plate 38, the spring 30, at its medial portion, is securely clamped in fixed position on the hub 31.

Again as shown in Fig. 4, the housing 23 for the jack shaft 24, is reduced in external diameter just beyond the trunnion hub 31, to form an annular shoulder 42, while outwardly beyond the shoulder 42, the housing is again reduced in external diameter and threaded to receive nuts 43. The shaft 24 extends beyond the outer end of the housing 23, where it is provided with a head 44 of disk form, which is secured to a hub 45 by means of screws 46.

The hub 45 is rotatably mounted on the housing 23 through the provision of roller bearings 47 and 48 encircling the reduced portions of the housing, and arranged at opposite sides of a flange 49 on the inside of the hub 45. Between the inner roller bearing 47 and the housing shoulder 42, is a sealing ring 50 the outer periphery of which is formed with grooves, as shown, operating to provide a grease seal for the inner end of the hub 45, it being understood that the hub is adapted to be packed with grease to lubricate the bearings.

This ring 50 abuts the outer end of the bushing 32 and the trunnion hub 31, and the ring may be fixedly held in this position, either by shrinking it on the shaft housing, or by adjustment of the nuts 43. Through adjustment of the nuts inwardly, pressure can be set up on the inner race of the outer bearing 48, thence through the outer race of the same bearing, against the outer side of the flange 49. From the flange 49 the pressure is transmitted to the outer race of the inner bearing 47, and from the latter to the inner race and finally to the sealing ring 50.

The hub 45 is designed for the purpose of providing a mounting for a pair of driving sprockets 52 and 53, the hub being formed with an annular series of elongated ears 54 through which bolts 55 extend for securing the sprockets to the ears. Thus, the sprockets are fixedly secured to the hub 45 for rotatable mounting on the housing 23, through the medium of the bearings 47 and 48. As the jack shaft 24 is secured to the hub 45 through the head 44 and the screws 46, it will be clear that rotary motion of the shaft 24 is transmitted to the hub 45 to drive the sprockets 52 and 53.

As shown in Fig. 4, the housing 23 is provided with a lip 56 against which the inner end of the trunnion hub 31 is adapted to abut, to define its position inwardly on the housing. Movement of the hub 33 outwardly on the housing, is definitely limited by the sealing ring 50 engaging the outer end of the hub, and, manifestly when the sealing ring is properly adjusted the ring and lip 56 coact to secure the hub against movement in either direction longitudinally on the housing.

As best shown in Figs. 2 and 3, each trunnion hub 31 is connected to a pair of axles 57 and 58 through the medium of a radius rod 59 and a torque rod 60. Each radius rod comprises a head 61 rotatable in a socket 62 formed in an enlargement 63, the latter being cast integral with the trunnion hub 31. The head 61 is on one end of a rod 64 threaded in a split sleeve 65 having clamping bolts 66. The sleeve is formed integral with a bar 67, pivotally connected to an ear 68 by means of a pin 69. The ear 68 is part of a bracket 70 clamped to the axle 57 or 58, by means of a plate 71 and bolts 72.

The torque rod 60 is of the same construction as the radius rod 58, except as to the connection of the arm 67 to the axle 57 or 58. In this instance the arm 67 is formed with a vertical sleeve 73, and at the top and bottom of the sleeve are ears 74, on the upper and lower parts 75 and 76 of a clamping bracket 78 secured to the axle 58 by bolts 79.

The brackets 70 and 78 are each formed with a box-like shackle 80 in which the ends of the suspension springs 30 are received to confine the spring ends against lateral movement, but to permit free longitudinal movement thereof.

As will be observed from Fig. 1, the radius and torque rods at one side of the vehicle frame are arranged oppositely from the radius and torque rods at the other side of the frame. That is to say, in one instance the torque rod 59 connects the axle 57 to the trunnion hub 31, while the radius rod 60 connects the axle 58 to the same trunnion hub. In the other instance, the radius rod 60 connects the axle 57 to the trunnion hub 31, while the torque rod 59 connects the axle 58 to the trunnion hub.

The purpose of this arrangement of radius rods and torque rods is, to not only achieve the normal functions of the rods, but to resist any twisting movements of the vehicle frame set up by brake applications. Thus, the vehicle frame is prevented from breaking by reason of such twisting, or the shifting of the load carried by the vehicle as a result of such twisting.

On each end of each axle 57 and 58 is a wheel 81 which, in the present instance, carries dual tires as shown. Each wheel carries a sprocket 82 about which is trained a chain 83, the chain also being trained about one or the other of the driven sprockets 52 or 53, whereby the jack shaft is drivingly connected to the wheel. In operation of the vehicle, the axles 57 and 58 and as well as the wheels 81, are free to move vertically and independently to compensate for any condition of road irregularity, the suspension springs permitting such operation by being mounted to oscillate on the housings 23.

By reason of the mounting of the trunnion hubs 31, wherein they are free to rotate on the housings 23 to allow the required oscillation of the suspension springs, the positive confinement of the hubs against movement outwardly on the housings, through the medium of the rings 50, causes the springs as connected to the axles to be utilized to prevent shifting of the axles longitudinally. Thus, the wheels are secured against shifting laterally or transversely in relation to the vehicle frame.

Wear of the ends of the hubs or the elements with which they contact can be compensated for, by adjustment of the nuts inwardly on the jack shafts.

An important feature of my invention is the construction and arrangement of the saddles 33 which permits the use of larger tires, without increasing the vehicle tread beyond that prescribed by law, so that greater traction may be had with the resultant obvious advantages.

As will be seen from a consideration of Figs. 1, 4 and 5, the ears 37 are at the upper extremities of the flange 36, thus permitting the use of the short bolts 41. By using short bolts, the inner sprocket 53 can be positioned almost in vertical alinement with the bolts, and still there is ample room for the chain 83, and its free movement onto and off of the sprocket. In consequence, the distance between sprockets 53 at opposite sides of the vehicle frame, is reduced over that of previous constructions and in an amount sufficient to permit the use of larger tires without exceeding the vehicle tread as prescribed by law.

Although I have herein shown and described only one form of six wheel motor vehicle embodying my invention, it is to be understood that various changes and modifications may be made therein without departing from the spirit of my invention and the spirit and scope of the appended claims.

I claim:

1. In a motor vehicle; a frame; differential jack shafts carried by said frame; housings for said shafts secured to said frame; trunnion hubs rotatable on said housings; suspension springs fixedly secured to said hubs and extending lengthwise of said frame; a pair of transverse axles spaced longitudinally along said frame; wheels carried by said axles; connections between said axles and said housings by which the axles are limited in their lengthwise shifting in relation to said springs; and means engaging said hubs for securing the latter against movement longitudinally of said housings, whereby said axles are held by said springs against shifting transversely of said frame.

2. In a motor vehicle; a frame; differential jack shafts carried by said frame; housings for said shafts secured to said frame; trunnion hubs rotatable on said housings; suspension springs fixedly secured to said hubs and extending lengthwise of said frame; a pair of transverse axles spaced longitudinally along said frame; wheels carried by said axles; connections between said axles and said housings by which the axles are limited in their lengthwise shifting in relation to said springs; and means for securing said hubs against movement longitudinally of said housings, said means each comprising two elements, engaging opposite ends of said hub, one formed on the respective housing and the other secured to said hub.

3. In a motor vehicle; a frame; differential jack shafts carried by said frame; housings for said shafts secured to said frame; trunnion hubs rotatable on said housings; suspension springs fixedly secured to said hubs and extending lengthwise of said frame; a pair of transverse axles spaced longitudinally along said frame; wheels carried by said axles; connections between said axles and said housings by which the axles are limited in their lengthwise shifting in relation to said springs; and means for securing said hubs against movement longitudinally of said housings; said means each comprising a fixed and an adjustable abutment on said housing engaging opposite ends of said hub.

HENRY C. HARBERS.